United States Patent
Kim et al.

(10) Patent No.: US 8,711,291 B2
(45) Date of Patent: Apr. 29, 2014

(54) DISPLAY APPARATUS

(75) Inventors: Yun-Joo Kim, Seoul (KR); Jong-Hyun Byeon, Seoul (KR); Moung-Youb Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 399 days.

(21) Appl. No.: 13/124,256

(22) PCT Filed: Dec. 28, 2009

(86) PCT No.: PCT/KR2009/007822
§ 371 (c)(1),
(2), (4) Date: Apr. 14, 2011

(87) PCT Pub. No.: WO2010/077032
PCT Pub. Date: Jul. 8, 2010

(65) Prior Publication Data
US 2011/0205454 A1    Aug. 25, 2011

(30) Foreign Application Priority Data

Dec. 29, 2008 (KR) .................. 10-2008-0135184

(51) Int. Cl.
*H04N 5/64* (2006.01)
*G02F 1/00* (2006.01)
*G02B 5/00* (2006.01)

(52) U.S. Cl.
CPC .............. *H04N 5/64* (2013.01); *H04N 5/642* (2013.01); *G02F 1/00* (2013.01); *G02B 5/00* (2013.01)
USPC ........... 348/836; 348/837; 348/838; 348/839; 348/840; 348/841; 348/842; 348/843

(58) Field of Classification Search
CPC ............ H04N 5/64; H04N 5/642; G02F 1/00; G02F 5/00
USPC ......................................... 348/836
See application file for complete search history.

(56) References Cited

U.S. PATENT DOCUMENTS

| | | | |
|---|---|---|---|
| 4,710,591 A | 12/1987 | Rochester, Jr. | 174/35 |
| 5,467,106 A * | 11/1995 | Salomon | 345/87 |
| 5,835,342 A * | 11/1998 | Hunte | 361/679.11 |
| 6,555,955 B1 * | 4/2003 | Honda | 313/489 |
| 7,157,850 B2 * | 1/2007 | Miyazaki et al. | 313/495 |

(Continued)

FOREIGN PATENT DOCUMENTS

| | | | | |
|---|---|---|---|---|
| EP | 2079796 B1 * | 8/2012 | | C08L 75/04 |
| JP | 2003-131580 A | 5/2003 | | |

(Continued)

OTHER PUBLICATIONS

International Search Report issued in PCT Application No. PCT/KR2009/007822 dated Apr. 5, 2010.

(Continued)

*Primary Examiner* — Andy Rao
*Assistant Examiner* — Shan Elahi
(74) *Attorney, Agent, or Firm* — KED & Associates, LLP

(57) ABSTRACT

A display apparatus has a structure in which a circumference of a front surface thereof is exposed to the outside. A front panel manufactured by an injection compression molding and formed of a transparent material is attached to a front surface of a display module.

22 Claims, 4 Drawing Sheets

(56) References Cited

U.S. PATENT DOCUMENTS

| | | |
|---|---|---|
| 7,348,964 B1 | 3/2008 | Gettemy et al. ............... 345/173 |
| 7,457,120 B2 * | 11/2008 | Bae et al. ...................... 361/704 |
| 7,639,489 B2 * | 12/2009 | Miyoshi et al. .......... 361/679.34 |
| 7,839,396 B2 * | 11/2010 | Yang et al. .................... 345/204 |
| 7,965,344 B2 * | 6/2011 | Wang et al. ................... 348/826 |
| 8,085,541 B1 * | 12/2011 | Vinciarelli et al. ............ 361/704 |
| 8,189,126 B2 * | 5/2012 | Wang et al. ................... 348/843 |
| 8,228,446 B2 * | 7/2012 | Fujikawa ....................... 348/836 |
| 8,251,341 B2 * | 8/2012 | Wang et al. ................... 248/688 |
| 8,531,826 B2 * | 9/2013 | Su ........................... 361/679.22 |
| 2007/0074316 A1 * | 3/2007 | Alden et al. .................. 977/762 |
| 2007/0096994 A1 * | 5/2007 | Kuroyanagi et al. ......... 343/702 |
| 2007/0264530 A1 * | 11/2007 | Takada et al. ............... 428/836.1 |
| 2008/0100771 A1 * | 5/2008 | Ableitner ........................ 349/61 |
| 2008/0297999 A1 | 12/2008 | Choi |
| 2008/0298001 A1 | 12/2008 | Choi |
| 2009/0325419 A1 * | 12/2009 | Oosawa ........................ 439/544 |

FOREIGN PATENT DOCUMENTS

| | | | |
|---|---|---|---|
| KR | 10-2008-0106603 | 12/2008 | |
| KR | 10-2008-0106605 | 12/2008 | |
| WO | WO 2007022226 A2 * | 2/2007 | ............... G02F 1/13 |
| WO | WO 2007/074847 A1 | 7/2007 | |

OTHER PUBLICATIONS

European Search Report dated Jun. 8, 2012 issued in Application No. 09 83 6353.

* cited by examiner

DISPLAY APPARATUS

TECHNICAL FIELD

The present disclosure relates to a display apparatus.

BACKGROUND ART

Display apparatuses are apparatuses that output images or moving pictures through an image output device.

In recently, liquid crystal display televisions (LCD TVs) using a liquid crystal panel or plasma display panel televisions (PDP TVs) using a plasma discharge, which are capable of performing various functions, are commercially available. In detail, such an LED TV does not include a separate transparent plate on a front surface of a display module. However, such a PDP TV includes a transparent plate on a front surface of a display module to shield electromagnetic waves or prevent noise from occurring.

Related art TVs generally have a structure in which a circumference of a display module is surrounded by a cabinet. As a result, it may give a feeling that an area of a screen on which images are displayed is less than an actual area of a front surface of a display apparatus.

DISCLOSURE OF INVENTION

Technical Problem

Embodiments provide a front surface structure of a display apparatus in which it gives an impression that a ratio of an area of an image output screen to an area of a front surface of the display apparatus increases than an actual ratio, and an outer appearance of the display apparatus looks elegant.

Solution to Problem

In one embodiment, a display apparatus includes: a display module on which an image is outputted; a front panel attached to a front surface of the display module, at least upper end of the front panel being bent backwardly and a circumference of the front panel being exposed; and a fixing bracket disposed on a back surface of a bent portion of the front panel.

In another embodiment, a display apparatus includes: display module on which an image is outputted; a front panel formed of a transparent material, the front panel being attached to a front surface of the display module; a fixing bracket coupled to a back surface of the front panel to allow the display module to be fixed to the back surface of the front panel; a decoration frame fixed to a back surface of the fixing bracket, a portion of an upper end of the decoration frame being exposed; a support frame supporting an edge of a back surface of the display module; and a back cover covering the display module on the back surface of the front panel in a state where a circumference of the front panel is exposed to the outside.

Advantageous Effects of Invention

In the display apparatus according to the embodiments, since a cabinet structure surrounding the circumference of the display module is not required, the outer appearance of the product can be elegantly designed.

Also, since the cabinet structure is removed, it can give an impression that the screen of the display apparatus increases in size than an actual size.

Also, since a portion of the circumference of the front surface of the display apparatus is bent backwardly, it can give an impression that the display apparatus increases in size when compared to a display apparatus having a flat front surface.

MODE FOR THE INVENTION

Reference will now be made in detail to the embodiments of the present disclosure, examples of which are illustrated in the accompanying drawings. The spirit and scope of the present disclosure, however, shall not be construed as being limited to embodiments provided herein. Rather, it will be apparent that other embodiments that fall within the spirit and scope of the present disclosure may easily be derived through adding, modifying, and deleting elements herein.

Figure 1:
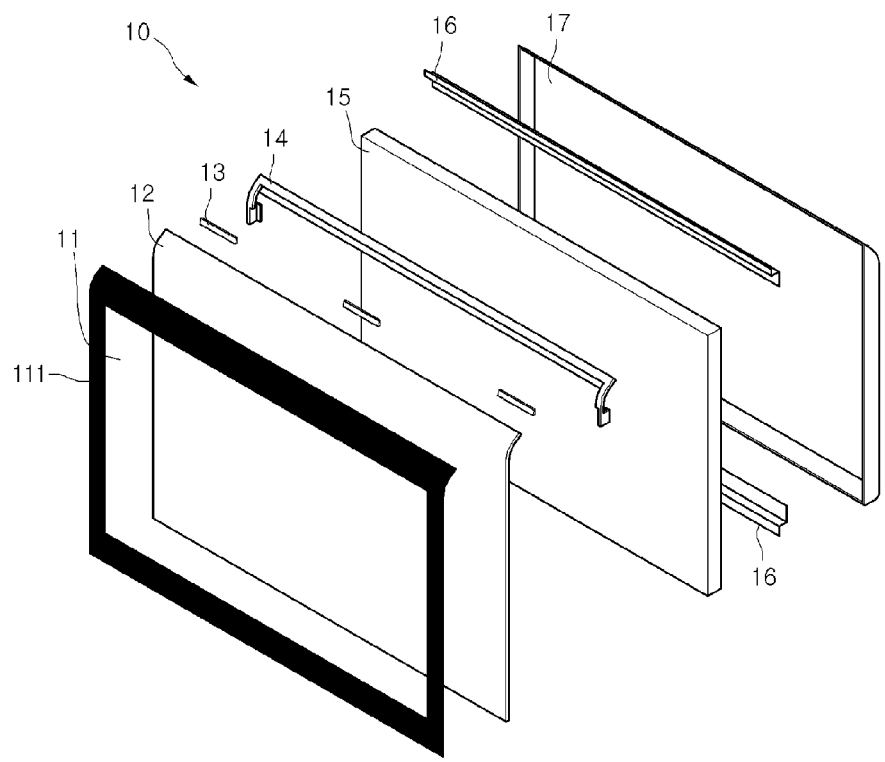
FIG. 1 is an exploded perspective view of a display apparatus according to an embodiment.
Figure 2:
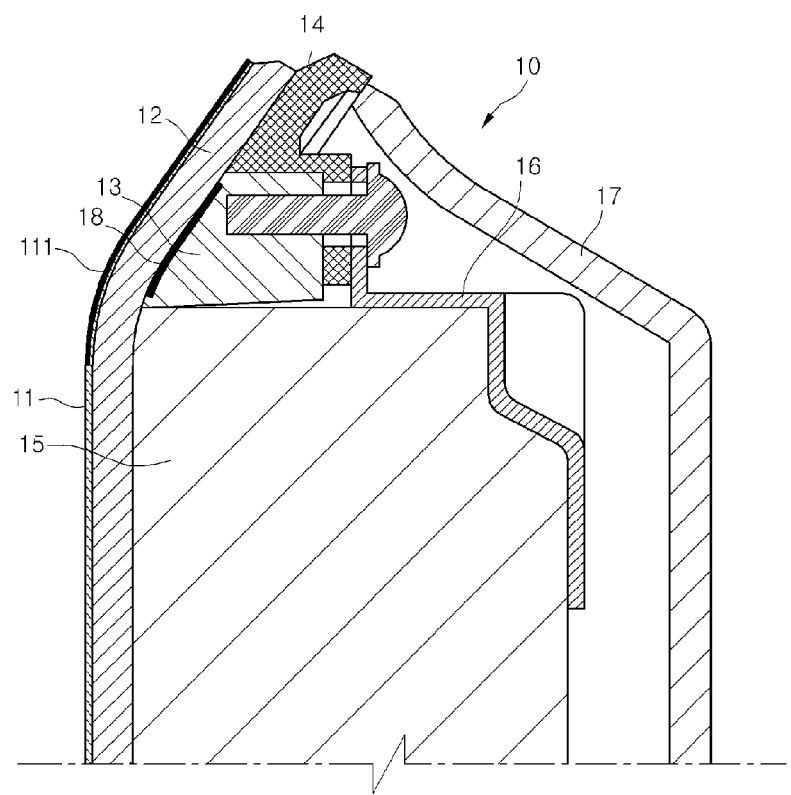
FIG. 2 is a side sectional view of the display apparatus.

FIG. 1 is an exploded perspective view of a display apparatus according to an embodiment, and FIG. 2 is a side sectional view of the display apparatus.

Referring to FIGS. 1 and 2, a display apparatus 10 according to an embodiment includes a display module 15, a front panel 12, a laminating film 11, a fixing bracket 13, a decoration frame 14, a support frame 16, and a back cover 17. An image is outputted on the display module 15. The front panel 12 is formed of a transparent material and disposed on a front surface of the display module 15. The laminating film 11 is attached to a front surface of the front panel 12. The fixing bracket 13 allows the display module 15 to be fixed to a back surface of front panel 12. The decoration frame 14 is seated on a top surface of the fixing bracket 13 to decorate a circumference of a top surface of the display apparatus 10. The support frame 16 supports the display module 15 to mount the display module 15 on the back surface of the front panel 12 without shaking of the display module 15. The back cover 17 is disposed on the back surface of the front panel 12 to cover the display module 15.

In detail, the laminating film 11 is attached to the front surface of the front panel 12 to prevent the front surface of the front panel 12 from being scratched. Thus, the laminating film 11 may be formed of a material having scratch resistance. A black-colored printed surface 111 is disposed on a circumference of the laminating film 11. The fixing bracket 13 and the support frame 16, which are coupled to the back surface of the front panel 12 are not exposed to the outside by the printed surface 111.

Also, the printed surface 111 has the same color as or substantially similar to the display module 15 in a state where the display module 15 is opened. Thus, an entire surface of the front panel 12 may be recognized as a screen of the display module 15 in the state where the display module 15 is opened. In other words, luminosity of the printed surface 111 may be equal to or somewhat less than that of an image output region of the display module 15 in a state where the display module 15 is turned off. Thus, the printed surface 111 has the same color as or a black color darker than that of the display module 15 in the state where the display module 15 is turned off. As a result, it may give an impression that an image output screen increases in size than an actual size. Here, the laminating film 11 is not separately attached, and the printed surface 111 may be printed on the front or back surface of the front panel 12.

The front panel 12 includes a transparent plate formed of a polycarbonate (PC) material and manufactured using an injection compression molding. The injection compression molding is a method in which a melted resin is filled into a molding space opened by a size corresponding to that of an ejection stroke while maintaining a lower clamping force, and then the resin is recompressed using the clamping force or a core within a mold. The injection compression molding has an injection filling pressure of about 100 kg/cm$^2$ to about 250 kg/cm$^2$. On the other hand, a general injection compression molding has an injection filling pressure of about 300 kg/cm$^2$ to about 800 kg/cm$^2$. That is, when injected, the injection filling pressure may significantly decrease, and a flow directing and a residual stress of an article may be relieved to obtain a uniform article due to the injection compression molding. In addition, since a gas is effectively exhausted, it may prevent the gas from being carbonized by poor gas exhaust, and weldlines and contraction may be reduced. Also, a wall thickness of the article may decrease, but a strength of the article may increase when compared to an article manufactured using the general injection compression molding.

The front panel 12 according to an embodiment includes an upper end having a shape bent with a predetermined curvature. Since the upper end of the front panel 12 is bent backwardly, it may give an impression that a front surface of the display apparatus increases in size than an actual size.

Also, the fixing bracket 13 is attached to the back surface of the front panel 12. The fixing bracket 13 is fixed to the back surface of the front panel 12 using an adhesive 18. In detail, the fixing bracket 13 is attached to a rear side of the bent surface of the front panel 12. The decoration frame 14 is coupled to the back surface of the fixing bracket 13. An upper end of the decoration frame is exposed to the outside. The decoration frame 14 has a specific color to decorate the circumference of the upper end of the display apparatus 10 with the specific color. For example, when the decoration frame 14 is plated with a gold color, the circumference of the upper end of the display apparatus 10 is decorated with a gold band to realize an elegant product. Although the fixing bracket 13 is disposed on only the upper end of the front panel 12 in the drawings, the fixing bracket 13 may be disposed on a lower end and lateral ends of the front panel 12. Also, both lateral ends of the decoration frame 14 may extend by a length corresponding to that of the front panel 12 (See a decoration frame of FIG. 7). That is, the circumferences of the upper surface and the lateral surfaces of the display apparatus 10 may be decorated with a specific color by the decoration frame 14.

Also, the front surface of the display module 15 is closely attached to the back surface of the front panel 12, and the upper and lower ends of the display module 15 are supported by the support frame 16. The display module 15 may be a liquid crystal display (LCD) module. In detail, the support frame 16 and the decoration frame 14 are integrally coupled to the back surface of the fixing bracket 13 by a coupling member. As shown in FIG. 2, the coupling member passes through the support frame 16 and the decoration frame 14 and is inserted into the fixing bracket 13 in a state where the decoration frame 14 and the support frame 16 are sequentially seated on the back surface of the fixing bracket 13. Thus, the display module 15 may be firmly fixed to the back surface of the front panel 12.

The back cover 17 covers and protects the display module 15. At least portion of a circumference of a front surface of the back cover 17 is closely attached to a rear surface of the decoration frame 14. Particularly, the circumference of a front upper side of the back cover 17 is closely attached to a rear end of the decoration frame 14 to expose the upper end of the decoration frame 14 to the outside. Thus, since the back cover 17 does not directly contact the front panel 12 or cover the circumference of the front panel 12, the area of the front surface of the display apparatus 10 does not decrease. Thus, it may give the impression that the screen of the display apparatus increases in size than an actual size.

Figure 3:
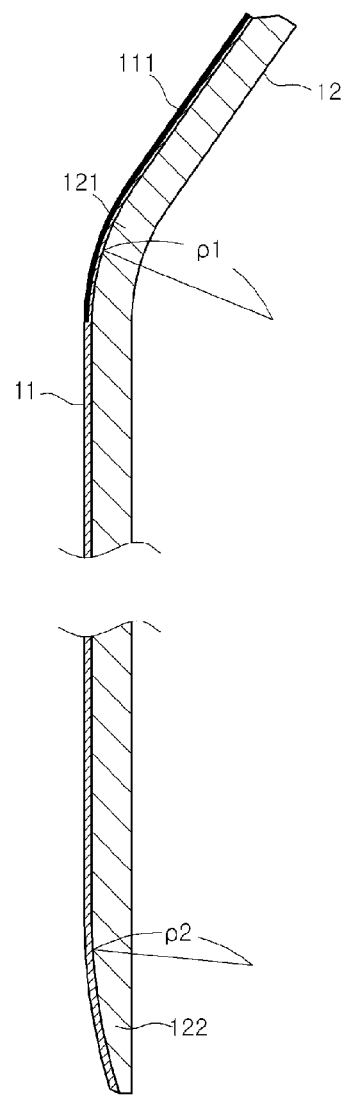
FIG. 3 is a sectional view illustrating an upper end and a lower end of a front panel according to an embodiment.

FIG. 3 is a sectional view illustrating an upper end and a lower end of a front panel according to an embodiment.

Referring to FIG. 3, as above-described, the upper end of the front panel 12 is bent backwardly at a predetermined curvature radius.

In detail, a bent portion 121 bent backwardly with a predetermined curvature ρ1 is disposed on an upper portion of the front panel 12 contacting the upper end of the display module 15. Thus, the bent portion 121 defines a portion of the upper surface of the display apparatus 10 as well as enlarges the area of the front surface of the display apparatus 10. The laminating film 11 is attached to the front surface of the front panel 12.

A portion of a lower side of the front panel 12 has a sectional shape having a thickness gradually decreasing toward the lower end thereof. That is to say, a variable portion 122 in which the front surface of the front panel 12 is rounded with a predetermined curvature ρ2 is disposed so that the front panel 12 has a thickness gradually decreasing from a position upwardly spaced a predetermined distance from the lower end of the front panel 12 up to the lower end of the front panel 12.

As described above, the upper and lower ends of the front panel 12 are bent backwardly to realize an elegant outer appearance of the product. Also, the back cover 17 may be minimally exposed to a user when viewed from a front side of the display apparatus 10.

Figure 4:
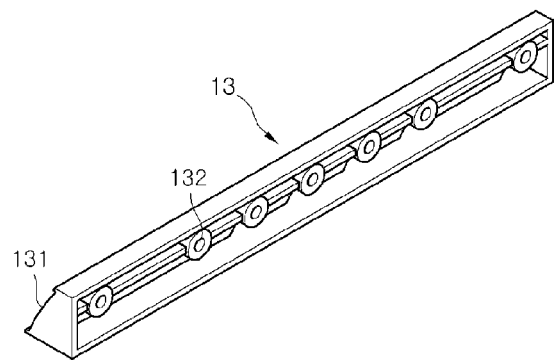
FIG. 4 is a bottom perspective view of a fixing bracket constituting the display apparatus according to an embodiment.

FIG. 4 is a bottom perspective view of a fixed bracket constituting the display apparatus according to an embodiment.

Referring to FIG. 4, the fixing bracket 13 according to an embodiment is a fixing unit that firmly fixes the display module 15 to the back surface of the front panel 12.

In detail, the fixing bracket 13 may include a plastic bracket formed of a acrylonitrile butadiene styrene (ABS) copolymer. The fixing bracket 13 and the front panel 12 may be firmly coupled to each other by the adhesive 18. The adhesive 18 has a high adhesion force as well as a property that can firmly couple the front panel 12 formed of the PC material to the fixing bracket 13 formed of the ABS copolymer.

In more detail, a recessed portion 131 on which the adhesive 18 is coated may be defined in a front surface of the fixing bracket 13. The front surface of the fixing bracket 13 may be bent with the same curvature as the bent portion 131 or inclined. A coupling boss 132 in which the coupling member is inserted is disposed on a back surface of the fixing bracket 13. A singular fixing bracket 13 having a length corresponding to a horizontal length of the front panel 12 may be attached to the back surface of the front panel 12. Alternatively, a plurality of fixing bracket 13 spaced from each other and having a length less than the horizontal length of the front panel 12 may be attached on the back surface of the fixing bracket 13 in a horizontal direction. As shown in FIG. 2, the coupling member sequentially passing through the support frame 16 and the decoration frame 14 is inserted into the coupling boss 132.

Figure 5:
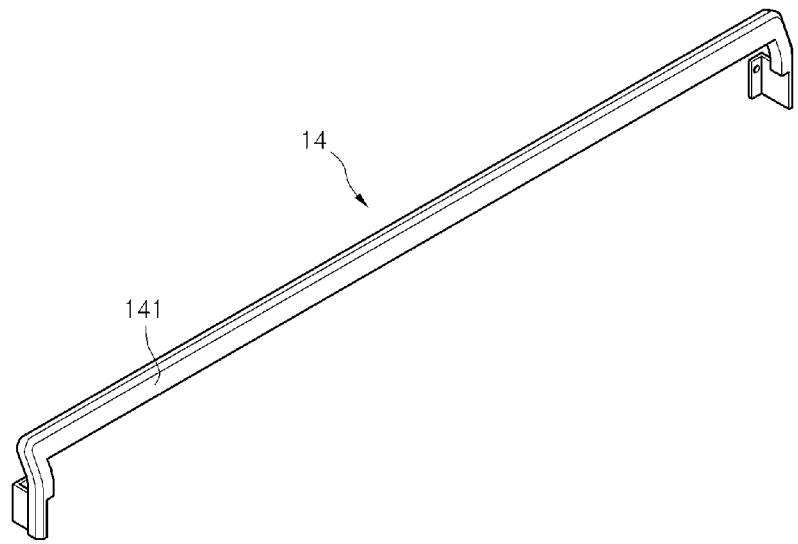
FIG. 5 is a front perspective view of a decoration frame constituting the display apparatus according to an embodiment.
Figure 6:
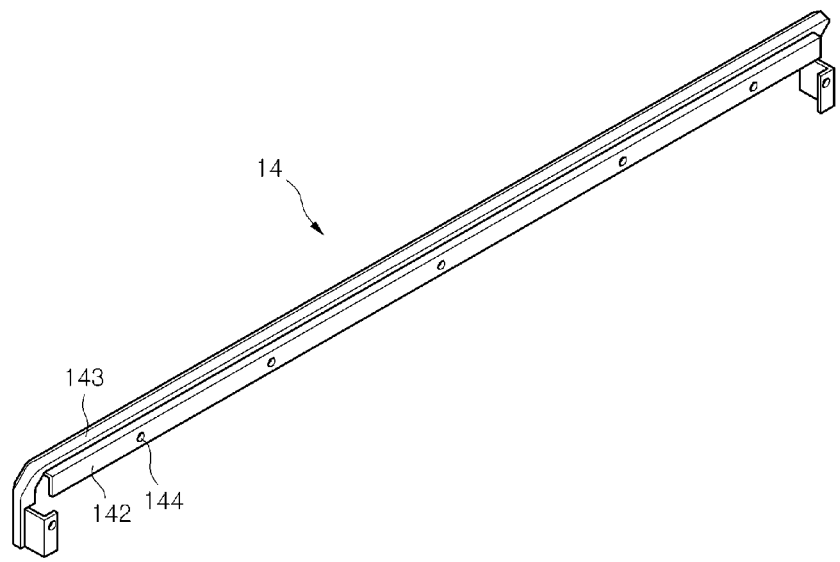
FIG. 6 is a bottom perspective view of the decoration frame.

FIG. 5 is a front perspective view of a decoration frame constituting the display apparatus according to an embodiment, and FIG. 6 is a bottom perspective view of the decoration frame.

Referring to FIGS. 5 and 6, the decoration frame 14 according to an embodiment includes a head part 141 and a coupling part 142 bent at a lower end of the head part 141 and extending from the lower end of the head part 141, thereby being seated on the back surface of the fixing bracket 13.

In detail, the head part 141 is attached to the back surface of an upper side of the bent portion 121 of the front panel 12. A plurality of coupling holes 144 through which the coupling member passes is defined in the coupling part 142. An exposed surface 143 is disposed on an upper end of the head part 141 and exposed to the outside after the display apparatus 10 is completely assembled. The at least exposed surface 143 is printed or plated with a specific color for decorating to decorate the upper surface of the display apparatus 10.

As described above, the coupling part 142 is seated on the back surface of the fixing bracket 13, and the support frame 16 is seated on the back surface of the coupling part 142. The coupling member such as a screw sequentially passes through the support frame 16 and the coupling holes 114, and then is inserted into the coupling boss 132 of the fixing bracket 13. Thus, the display module 15 is fixed to the back surface of the front panel 12 without shaking due to the support frame 16.

Figure 7:
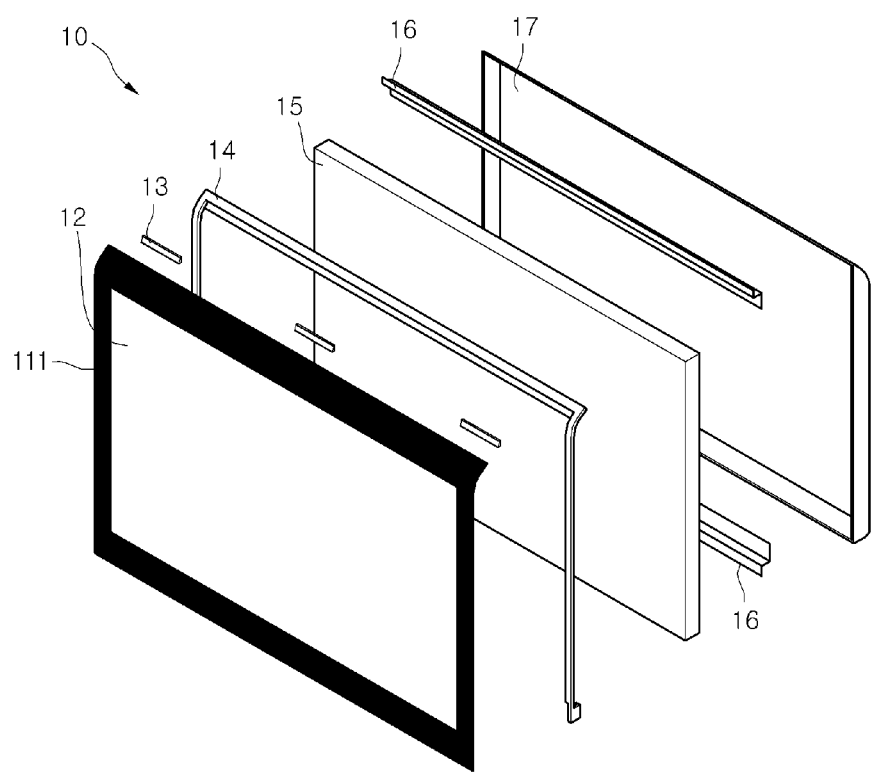
FIG. 7 is an exploded perspective view of a display apparatus according to another embodiment.

FIG. 7 is an exploded perspective view of a display apparatus according to another embodiment.

Another embodiment illustrated in FIG. 7 is similar to the previously described embodiment of FIG. 1.

Referring to FIG. 7, a display apparatus 10 according to this embodiment is characterized in that a laminating film 11 having a printed surface 111 is removed and the printed surface 111 is coated on a front or back surface of the front panel 12.

Also, both lateral ends of a decoration frame 14 extend by a length corresponding to those of lateral surfaces of the front panel 12 to decorate upper and lateral surfaces of the display apparatus 10 with a specific color. Since other parts have the same structure as the previously described embodiment, their detailed descriptions will be omitted.

Although various embodiments are proposed, the sprit of the present disclosure is not limited to the proposed embodiments, and a person of ordinary skill in the art would easily propose other embodiments that come within the spirit of the present invention by adding, modifying, and deleting elements, which will be also included in the present disclosure.

The invention claimed is:

1. A display apparatus comprising:
a display module on which an image is outputted;
a front panel attached to a front surface of the display module, at least an upper end of the front panel being bent backwardly to form a bent portion and a circumference of the front panel being exposed to an outside;
a fixing bracket attached to a back surface of the bent portion of the front panel; and
a black colored printed surface formed on a front surface or a back surface of the front panel,
wherein the front panel and the black colored printed surface overflaps the fixing bracket at a front of the fixing bracket, such that the fixing bracket is not exposed to the outside.

2. The display apparatus according to claim 1, further comprising a back cover covering the display module on the back surface of the front panel.

3. The display apparatus according to claim 1, further comprising a decoration frame fixed to a rear side of the fixing bracket and extending along an upper end of the front panel, wherein at least a portion of the decoration frame is exposed to the outside.

4. The display apparatus according to claim 3, wherein both lateral ends of the decoration frame extend downwardly along lateral surfaces of the bent portion of the front panel.

5. The display apparatus according to claim 1, further comprising a laminating film attached to the front surface of the front panel.

6. The display apparatus according to claim 5, wherein the laminating film has an opaque circumference to prevent the fixing bracket from being exposed.

7. The display apparatus according to claim 5, wherein the laminating film has the black colored printed surface printed with black color equal or substantially similar to that of the display module in a state where the display module is turned off.

8. The display apparatus according to claim 1, wherein a portion of a front surface of the front panel is rounded to have a thickness gradually decreasing toward a lower end of the front panel.

9. The display apparatus according to claim 1, wherein the fixing bracket is coupled to the back surface of the front panel by an adhesive.

10. The display apparatus according to claim 9, wherein the fixing bracket is formed of an acrylonitrile butadiene styrene (ABS) copolymer, and the front panel is formed of a polycarbonate (PC) material.

11. The display apparatus according to claim 1, wherein the front panel comprises a plastic plate formed of a transparent material and manufactured by an injection compression molding.

12. The display apparatus according to claim 1,
wherein luminosity of the black colored printed surface is less than that of an image output region of the display module in a state where the display module is turned off.

13. A display apparatus comprising:
a display module on which an image is outputted;
a front panel formed of a transparent material, the front panel being attached to a front surface of the display module;
a fixing bracket coupled to a back surface of the front panel to allow the display module to be fixed to the back surface of the front panel;
a decoration frame fixed to a back surface of the fixing bracket, a portion of an upper end of the decoration frame being exposed to an outside;
a support frame supporting an edge of a back surface of the display module; and
a back cover covering the display module on the back surface of the front panel in a state where a circumference of the front panel is exposed to the outside, and
a black colored printed surface formed on a front surface or a black surface of the front panel,
wherein the front panel and the black colored printed surface overlaps the fixing bracket at a front of the fixing bracket, such that the fixing bracket is not exposed to the outside.

14. The display apparatus according to claim 13, wherein the support frame and the decoration frame are integrally coupled to the back surface of the fixing bracket by a coupling member.

15. The display apparatus according to claim 14, wherein the coupling member sequentially passes through the support frame and the decoration frame and is inserted into the back surface of the fixing bracket.

16. The display apparatus according to claim 14, wherein the decoration frame comprises:
   a head part of which a front surface is closely attached to the back surface of the front panel and a portion of an upper end is exposed; and
   a coupling part bent at and extending from the lower end of the head part, thereby being seated on the back surface of the fixing bracket.

17. The display apparatus according to claim 16, wherein a lateral end of the decoration frame extends along a lateral surface of the front panel up to a lower end of the front panel.

18. The display apparatus according to claim 16, wherein the support frame has one portion supporting the back surface of the display module and the other portion seated on the coupling part.

19. The display apparatus according to claim 13, wherein a recessed portion in which an adhesive is received is defined in a front surface of the fixing bracket, and a coupling boss in which a coupling member passing through the support frame and the decoration frame is inserted is disposed on the back surface of the fixing bracket.

20. The display apparatus according to claim 13, wherein a film is attached to a front surface of the front panel,
   the black colored printed surface is a circumference of the film being opaquely processed.

21. The display apparatus according to claim 13, wherein the display module comprises a liquid crystal display module.

22. The display apparatus according to claim 13, wherein luminosity of the black colored printed surface is equal to or less than that of the display module.

* * * * *